United States Patent
Kinkelin et al.

(10) Patent No.: US 6,255,443 B1
(45) Date of Patent: Jul. 3, 2001

(54) LOW-MELTING COPOLYESTER AND COPOLYETHERESTER HOT-MELT ADHESIVES

(75) Inventors: Eberhard Kinkelin, Chur; Jürgen Spindler, Dormat/Ems; Gerhard Pössenecker, Trin, all of (CH)

(73) Assignee: EMS Chemie AG, Domat/Ems (CH)

( * ) Notice: Subject to any disclaimer, the term of this patent is extended or adjusted under 35 U.S.C. 154(b) by 0 days.

(21) Appl. No.: 09/352,998

(22) Filed: Jul. 13, 1999

(30) Foreign Application Priority Data

Jul. 13, 1998 (DE) .............................. 198 31 366

(51) Int. Cl.$^7$ .......................... C08G 63/02; C08G 63/16; C08G 63/18; C08G 63/181; C08G 63/183
(52) U.S. Cl. ...................... 528/302; 528/308; 528/308.6; 528/308.7
(58) Field of Search ..................................... 428/480, 343, 428/346, 347, 349, 355 R; 528/302, 308, 308.6, 308.7; 156/244.11, 283, 308.2, 320

(56) References Cited

U.S. PATENT DOCUMENTS

| | | | |
|---|---|---|---|
| 3,699,187 | * 10/1972 | Gardziella | 260/860 |
| 4,094,721 | * 6/1978 | Sturm et al. | 156/309 |
| 4,124,571 | * 11/1978 | Georgoudis | 260/16 |
| 4,299,934 | * 11/1981 | Petke et al. | 525/173 |
| 4,328,059 | * 5/1982 | Horlbeck et al. | 156/332 |
| 4,328,278 | 5/1982 | Sublett | 428/246 |
| 4,363,853 | * 12/1982 | Imamura et al. | 428/480 |
| 4,966,959 | 10/1990 | Cox et al. | 528/272 |
| 4,975,477 | * 12/1990 | Cox et al. | 524/77 |

FOREIGN PATENT DOCUMENTS

| | | |
|---|---|---|
| 618 199 | 7/1980 | (CH) . |
| 196 32 473 | 2/1998 | (DE) . |
| 196 32 474 | 2/1998 | (DE) . |
| 0548818 | 6/1993 | (EP) . |

OTHER PUBLICATIONS

XP–002124040, Sep. 4, 1992.

* cited by examiner

*Primary Examiner*—Vivian Chen
(74) *Attorney, Agent, or Firm*—Browdy and Neimark

(57) ABSTRACT

Novel, quick-crystallizing hot-melt adhesive masses having a melting point between 60° and 100° C. comprise a statistically-proportioned copolyester or copolyetherester based on terephthalic acid, adipic acid and a mixture of aliphatic diols; the molar proportion of terephthalic acid is between 55 and 85 mole %, relative to the total acid quantity; and the molar proportion of adipic acid is between 15 and 40 mole %. A combination of butane diol and hexane diol is used as the diol component; the molar component of butane diol is between 40 and 55 mole %; and the molar proportion of hexane diol is between 40 and 60 mole %. Up to 15 mole % of a dimer acid having a molar mass between 400 and 800 g/mole, or up to 10 mole % of a higher-molecular polyethylene glycol having a molecular mass of 600 to 4000 g/mole, can be used to increase the flexibility. The copolyester or copolyetherester hot-melt adhesive masses of the invention can be used in the hot-melt method, and in powder-form coating methods.

1 Claim, No Drawings

LOW-MELTING COPOLYESTER AND COPOLYETHERESTER HOT-MELT ADHESIVES

FIELD OF INVENTION

The present invention relates to thermoplastic copolyesters and copolyetheresters for hot-melt adhesive applications.

BACKGROUND OF THE INVENTION

The use of different copolyesters and copolyetheresters is described at length in the literature.

DE 196 32 473 and DE 196 32 474 describe fast crystallizing and highly-flexible copolyetherester hot-melt adhesives based on terephthalic acid, butane-1,4-diol, diethylene glycol, triethylene diol and polyethylene glycol. These copolyetheresters crystallize very fast at a melting point of over 115° C. The lower-melting polyesters, having a melting point of about 90° C., are not suitable for adhesive use as a film, web or powder due to their lower crystallization speed and the associated stickiness.

EP 698 648 describes low-melting copolyesters having a melting point of 60–130° C. for the hot-melt adhesive range. These polyesters are based on terephthalic acid, isophthalic acid, butane-1,4-diol, diethylene glycol and triethylene glycol. Ensuing from this monomer composition is the sole fact that the crystallization speed is far too low to justify the claims set forth in this document.

JP 59 011 383 describes polyesters for hot-melt PVC bonding adhesives having melting points of 80–160° C., comprising terephthalic acid, adipic acid, butane diol and diethylene glycol. This combination also yields an insufficient crystallization speed.

CH 618199 describes numerous copolyesters and their compositions, the copolyesters having melting points of 50–200° C. The crystallization behavior, however, is characterized as very slow.

Finally, U.S. Pat. No. 4,551,521 describes low-melting polyester adhesives having melting points of 60–130° C. These polyesters primarily comprise adipic acid and cyclohexane dimethanol, and readily fulfill the criterion of a high crystallization speed. In contrast to the polyesters and copolyetheresters of the present invention, however, the polyesters are completely aliphatic; in other words, no terephthalic acid is used. Completely-aliphatic polyesters have excellent biodegradability, but are therefore naturally susceptible to weather influences and moisture. This property is counterproductive for a hot-melt adhesive that is intended to connect two substrates and must possess a certain resistance to heat. According to the invention, the greater biodegradability is assured up to a 30% proportion of aromatic components.

All of the copolyesters or copolyetheresters described in the prior art are associated with significant drawbacks, and do not yield thermoplastic copolyester or copolyetherester hot-melt adhesive masses having the low melting point, high crystallization speed, high flexibility and chemical stability that would make them suitable for use as hot-melt adhesives in technical applications for difficult substrates.

Thus, a need exists for developing quick-crystallizing and lightly-flexible products, having maximum melting temperatures of 100° C., for hot-melt adhesive applications.

SUMMARY OF THE INVENTION

The invention is particularly oriented toward linear, low-melting, fast crystallizing and flexible copolyesters or copolyetheresters based on terephthalic acid, adipic acid, butane-1,4-diol, hexane-1,6-diol and, optionally, a long-chain, aliphatic component, such as polyethylene glycol, having an average molecular weight of 600 to 4000 g/mole or a dicarboxylic acid having an average molecular weight of 400 to 800 g/mole. Copolyesters containing components such as polyethylene glycol are no longer pure copolyesters, but instead copolyetheresters. The melting points of the described polyesters or copolyetheresters are in a range of 65–95° C.

These polyesters or polyetheresters serve as hot-melt adhesive masses for technical and textile applications in which temperature-sensitive substrates must be bonded.

The advantage of a low melting point, i.e. maximum of about 100° C., lies in the possibility of using lower application temperatures. This is most critical in the field of technical adhesives when substrates, such as PVC or polyolefins, are used, which have melting temperatures of less than 120° C. These low-melting polyester adhesives can also be used in the field of fusible interlinings if the substrates to be bonded are extremely temperature sensitive and tend to shrink, or even be destroyed, at excessive application temperatures.

The use of a copolyester or copolyetherester having a high crystallization speed is desirable for numerous reasons. The formation of crystalline regions is a prerequisite for the mechanical stability of a polymer above the glass-transition temperature. The faster these crystalline domains can form, the more mechanical stress the adhesion point can endure.

Furthermore, the surface stickiness of a polymer hot-melt adhesive is directly dependent on its crystallization. The lower the tendency toward crystallization, the longer the adhesive, e.g. in the form of films or adhesive nets, remain sticky. This poses problems when such films are rolled, for example, because the individual layers can stick to one another and render the entire roll unusable. This effect can be circumvented by the application of a so-called carrier film, which separates the applied adhesive from the next layer. Before the adhesive is pressed together with the further substrate, however, the film must be removed, which adds labor and, more importantly, increases waste. Another possibility is the use of time- and energy-consuming tempering procedures, which are naturally disadvantageous for the overall production process. The use of a fast-crystallizing polymer obviates all of these costly steps.

The advantages of highly-flexible products are clear. On the one hand, depending on the substrate, sufficient adhesive values and durability for adhesive connections in the field of technology can only be attained with flexible adhesive masses.

On the other hand, coated and bonded parts can be exposed at a later time to stresses and deformations, which cause conventional adhesives to lose their adhesive properties and lead to the detachment of substrates. In these cases, a highly-flexible adhesive is the only option for producing a permanent connection of materials.

It is therefore a principal object of the invention to reconcile the four required characteristics of "low melting point," "high crystallization speed," "high flexibility" and "high chemical stability" through the suitable combination of raw materials.

DETAILED DESCRIPTION OF THE INVENTION

The above object is accomplished by the low-melting, fast-crystallizing and highly-flexible copolyester or copolyetherester hot-melt adhesive masses comprising statistically-proportioned copolyesters or copolyetheresters based on terephthalic acid, adipic acid and a mixture of aliphatic diols, characterized in that the molar proportion of the acid components is 55 to 85 mole % of terephthalic acid, 15 to 40 mole % of adipic acid, and eventually 0 to 15 mole % of a long-chain, aliphatic dicarboxylic acid having a molar mass of 400 to 800 g/mole; the molar proportion of the diol components is 40 to 55 mole % of butane diol, 40 to 60 mole % of hexane diol, eventually 0 to 10% mole % of a long-chain, aliphatic diol having a molar mass of 600 to 4000 g/mole; and the melting point of the copolyester or copolyetherester hot-melt masses is 65–95° C.

The solution to the object lies especially in hot-melt adhesive masses comprising statistically-proportioned copolyesters and copolyetheresters, respectively, made up of a combination of butane diol (BD) and hexane diol (HD) and eventually other selected long-chain, linear, aliphatic diols and terephthalic acid (TPS) and adipic acid (ADI) and eventually other selected long-chain, aliphatic dicarboxylic acids as the acid components. The viscosity of these low-melting products is preferably less than 400 Pa*s at 160° C. to permit processing as a hot-melt at low temperatures.

In the use of terephthalic acid alone as the acid component, the melting points are generally far above the desired range. A reduction in the melting point is readily possible through a partial substitution of the terephthalic acid with another acid, e.g. isophthalic acid. Such a combination, however, considerably worsens the crystallinity or the crystallization speed, and is therefore undesirable.

Another solution is the use of diol components other than butane-1,4-diol. In this instance, a 1:1 mixture of butane diol and hexane diol with terephthalic acid as the sole acid component permits the melting point to be set at about 125° C., in comparison to a melting point of 225° C. for the combination of terephthalic acid and butane diol.

Surprisingly, in the present invention, the combination of the four monomers of terephthalic acid, adipic acid, butane diol and hexane diol permits the production of polyesters whose melting points are significantly lower than 100° C., and which are flexible and very fast to crystallize, in a relatively narrow range.

Although the use of these monomers yields a high polymer flexibility, the flexibility can be further increased considerably merely through the use of a long-chain, aliphatic diol and/or a long-chain, aliphatic dicarboxylic acid. The amount of these long-chain, aliphatic monomers that can be added is, however, limited, because the use of more than 20 mole %, relative to the total acid quantity, reduces the glass-transition temperature too far and makes processing impossible.

Although numerous existing publications relate the field of adhesives, the attained characteristics are unique and have never been described.

The molar proportion of terephthalic acid is 55 to 85 mole %, preferably 60 to 80 mole %, and the proportion of adipic acid is 15 to 40 mole %, preferably 20 to 40 mole %, relative to the respective total acid quantity. It is possible to use 0 to 15 mole %, preferably 0 to 12 mole %, of a long-chain, aliphatic dicarboxylic acid having a molecular weight of about 400 to 800 g/mole, as the long-chain, aliphatic co-acid component. The most highly preferred co-acid components are so-called dimer fatty acids, or dimer acids such as a $C_{36}$ dicarboxylic acid known commercially as Empol® 1062, which has an average molecular weight of 565 g/mole.

The molar proportion of butane diol is 40 to 55 mole %, preferably 40 to 45 mole %, and the proportion of hexane diol is 40 to 60 mole %, preferably 45 to 60 mole %, relative to the respective total diol quantity. The mixture may further include a long-chain, aliphatic diol component in a quantity of 0 to 10 mole %, preferably 0 to 8 mole %. Preferred long-chain, aliphatic diols are higher-molecular polyether diols, especially polyethylene glycols, having an average molecular weight of 500 to 4000 g/mole.

The melting points of the copolyester and copolyetherester hot-melt adhesive masses of the invention are between 60 and 100° C., preferably between 65 and 90° C. The melting viscosity, measured at 160° C. and with a load of 2.16 kg according to DIN/ISO 1133, is preferably not over 800 Pa•s, especially not over 400 Pa•s.

The copolyester or copolyetherester hot-melt adhesive masses can further include standard additives, such as heat stabilizers, color stabilizers, etc.

The advantages of the copolyester or copolyetherester hot-melt adhesive masses of the invention lie in the special effect—which is not elsewhere described—of the combination of terephthalic acid, adipic acid, butane diol, hexane diol and, possibly, higher-molecular components, such as polyethylene glycol and dimer acid, which shifts the melting point into the desired range, on the one hand, and is responsible for the high crystallization speed, high flexibility and chemical stability, on the other hand.

The copolyester or copolyetherester hot-melt adhesive masses of the invention are primarily used in the hot-melt method because of their flexibility, but can also be used in known powder-form coating methods, such as powder-point coating, paste-point coating and scatter coating.

The copolyester or copolyetherester hot-melt adhesive masses of the invention can be used with a reduced softener quantity to produce glues and pastes.

The following illustrative (not limitative) examples are provided for comparing the copolyesters or copolyetheresters that can be used for the hot-melt adhesives of the invention to other products; Examples 9 and 10 serve as comparison examples and are not encompassed by the present invention.

The thermal analyses, such as the determination of the melting point and the glass-transition temperature, were performed with a DSC (differential scanning calorimetry) device by TA Instruments. The assumed melting point is the maximum of the melting peak during the first heating; the assumed glass-transition temperature $T_g$ is the center of the two baselines during the second heating. The maximum of the peak in the controlled cooling is measured as the solidification point; the center of the endotherm peak during the second heating is measured as the cold-crystallization point. The first and second heating are performed at a speed of 20 K/min. The cooling curve is run at a speed of 5 K/min. The sample is quickly quenched with liquid nitrogen prior to the second heating.

The melt viscosity was determined according to the discharge method at 160° C. and with a load of 2.16 kg according to DIN/ISO 1133.

In the examples, a polyether glycol having an average molecular weight of 600 g/mole (Pluriol® E 600, supplied by BASF AG) was used as a higher-molecular ether diol, and a $C_{36}$ dicarboxylic acid having an average molecular weight of 565 g/mole (Empol® 1062, supplied by Hoechst AG) was used as a long-chain, aliphatic dicarboxylic acid. A commercially-available tin catalyst served as an esterification catalyst, and a commercially-available phosphite was used as a heat stabilizer.

EXAMPLE 1

In a 10-I esterification reactor provided with a temperature sensor, a mixer, a reflux column and a distillation bridge, 1.11 kg (12.25 moles) of butane diol, 1.41 kg (11.9 moles) of hexane diol and 0.88 kg (1.45 moles) of polyethylene glycol having an average molecular weight of 600 are combined and melted at 140° C. in a nitrogen atmosphere that is maintained during the entire reaction. Then, 2.13 kg (12.8 moles) of terephthalic acid, 0.80 kg (5.5 moles) of adipic acid and 3 g of an esterification catalyst are stirred in. After the internal temperature is increased in increments to 235° C., the reaction is continued until no more distillate is produced. Afterward, 10 g of heat stabilizer are added. The temperature is increased to 250° C., and a vacuum is applied in increments until an end vacuum of <1 mbar is attained.

The condensation is continued for at least two hours until the desired viscosity is attained.

After a 24-hour drying period at 50° C., the obtained polyetherester has a melting point of about 78° C., a $T_g$ of about −30° C. and a melting viscosity of 350 Pa*s, measured at 160° C. and with a load of 2.16 kg.

EXAMPLES 2–10

The polyesters or polyetheresters were produced analogously to Examples 1, and are summarized in Table 1. Here, Examples 1 through 8 are within the scope of the invention. Examples 9 and 10 serve as comparison examples.

The occurrence of a solidification point during cooling serves as a measure for the crystallization speed. The presence of a cold-crystallization point indicates a quick-crystallizing system. If, however, this peak is absent, or is only slightly pronounced, and a distinct melting peak occurs, this is an indication of a very fast-crystallizing system.

The polyetherester from Example 9 has a low melting point, and is also flexible. Because of the lower crystallization speed, however, films, webs and powders cannot be produced.

The polyester from Comparison Example 10 is low-melting and fast-crystallizing. Nevertheless, the purely-aliphatic structure is, as described above, undesirable because of its chemical degradability and biodegradability, which are sharply increased in comparison to the polyesters and polyetheresters of Examples 1 through 8.

EXAMPLE 11

The copolyetherester from Example 1 was used to perform coating tests to determine the original bonding strength and the thermal stability. To test the adhesive strength with respect to textiles, powders of this copolyetherester having a particle size of 80 to 200 μm were applied to a commercially-available interlining fabric by means of scatter coating so as to have a coating weight of 40 g/m², and the interlining was subsequently pressed with a commercially-available outer fabric under a pressing pressure of 0.4 bar.

To measure the adhesive strength with respect to textiles, 5-cm-wide, bonded textile steps were stretched in a tractive machine. The test parameters were constant for all measurements:

| | |
|---|---|
| Test speed: | 100 mm/min. |
| Test-body width: | 50 mm |
| Test path: | 80 mm |
| Bias force: | 0 N |
| Test temperature: | 25° C. |

To measure the thermal stability, a weight of 250 g/5 cm was suspended from the glued textile strips. The samples were suspended, with the weights, in a forced-air oven that was heated at a rate of 1° C./min. The temperature at which the adhesive fails is referred to as the thermal stability. A pressing temperature of 100° C. yielded an original bonding strength of 25N/5 cm and a thermal stability of 80° C., both excellent values.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . ." and "means for . . .", or any method step language, as may be found in the

TABLE 1

| | 1 | 2 | 3 | 4 | 5 | 6 | 7 | 8 | 9 | 10 |
|---|---|---|---|---|---|---|---|---|---|---|
| Terephthalic Acid (Mole %) | 70 | 80 | 70 | 63 | 60 | 70 | 65 | 62 | 100 | |
| Adipic Acid (Mole %) | 30 | 20 | 30 | 27 | 30 | 30 | 35 | 38 | | 100 |
| Dimer Acid (Mole %) | | | | 10 | 10 | | | | | |
| Butane Diol (Mole %) | 48 | 48 | 44 | 45 | 45 | 48 | 43 | 48 | 48 | 30 |
| Hexane Diol (Mole %) | 46 | 46 | 50 | 55 | 55 | 52 | 57 | 52 | | |
| Triethylene Glycol (Mole %) | | | | | | | | | 46 | |
| Cyclohexane Dimethanol (Mole %) | | | | | | | | | | 70 |
| Polyethylene Glycol 600 (Mole %) | 6 | 6 | 6 | | | | | | 6 | |
| Melting Point (DSC, ° C.) | 78 | 89 | 79 | 78 | 68 | 91 | 93 | 78 | 90 | 83 |
| Solidification Point (DSC, ° C.) | 21 | 44 | 34 | 35 | — | 28 | 47 | 28 | — | 52 |
| Cold-Cryst Point (DSC, ° C.) | ↑ | ↑ | ↑ | 19 | 15 | ↑ | 13 | ↑ | 46 | ↑ |
| Glass-Trans. Temp. $T_g$ (DSC, ° C.) | −30 | −28 | −26 | −17 | −25 | −11 | −7 | −20 | −6 | nd |
| Melting Viscosity (160° C./2.16 kg) | 350 | 300 | 250 | 200 | 280 | 320 | 350 | 400 | 200 | 250 |

Data given in mole % relative to 100 mole % total acid and 100 mole % total diol
↑: not present or only very weakly/slightly pronounced → very fast-crystallizing
nd: not determined specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A hot-melt adhesive comprising a copolyester or copolyetherester formed of terephthalic acid, adipic acid and a mixture of aliphatic diols, wherein, based on 100 mole % of acid components, the molar proportion of terephthalic acid is 55 to 85 mole %, the molar proportion of adipic acid is 15 to 40 mole %, and the molar proportion of a long-chain, aliphatic dicarboxylic acid having a molar mass of 400 to 800 g/mole is 0 to 15 mole %; based on 100 mole % of diol components, the molar proportion of butane diol is 40 to 55 mole %, the molar proportion hexane diol is 40 to 60 mole %, and the molar proportion of a long-chain, aliphatic diol having a molar mass of 600 to 4000 g/mole is 0 to 10 mole %; and the melting point of the copolyester or copolyetherester hot-melt is 65° C. to 95° C.;

said copolyester or copolyetherester being selected from the group consisting of a polymer formed of 70 mole % terephthalic acid, 30 mole % adipic acid, 48 mole % butane diol, 46 mole % of hexane diol and 6 mole % polyethylene glycol, said polymer having a melting point of approximately 78° C. and a glass transition temperature of approximately −30° C.;

a polymer formed of 80 mole % terephthalic acid, 20 mole % adipic acid, 48 mole % butane diol, 46 mole % hexane diol and 6 mole % polyethylene glycol, and having a melting point of approximately 89° C. and a glass transition temperature of approximately −28° C.;

a polymer formed of 70 mole % terephthalic acid, 30 mole % adipic acid, 44 mole % butane diol, 50 mole % hexane diol and 6 mole % polyethylene glycol, and having a melting point of approximately 79° C. and a glass transition temperature of approximately −26° C.;

a polymer formed of 63 mole % terephthalic acid, 27 mole % adipic acid, 10 mole % dimer acid, 45 mole % butane diol and 55 mole % hexane diol, and having a melting point of approximately 78° C., a glass transition temperature of −17° C. and a cold crystallization point of approximately 19° C.;

a polymer formed of 60 mole % terephthalic acid, 30 mole % adipic acid, 10 mole % dimer acide, 45 mole % butane diol and 55 mole % hexane diol, and having a melting point of approximately 68° C., a glass transition temperature of −25° C. and a cold crystallization point of approximately 15° C.; and a polymer formed of 62 mole % terephthalic acid, 38 mole % adipic acid, 48 mole % butane diol and 52 mole % hexane diol, and having a melting point of approximately 78° C. and a glass transition temperature of approximately −20° C.

* * * * *